(12) United States Patent
Mullen et al.

(10) Patent No.: US 11,964,754 B2
(45) Date of Patent: Apr. 23, 2024

(54) BEARING ASSEMBLY

(71) Applicant: Lockheed Martin Corporation, Bethesda, MD (US)

(72) Inventors: Michael F. Mullen, Cheshire, CT (US); Jimmy Yeung, Woodside, NY (US); Noah McCreight, Brooklyn, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 174 days.

(21) Appl. No.: 17/559,123

(22) Filed: Dec. 22, 2021

(65) Prior Publication Data

US 2023/0192278 A1 Jun. 22, 2023

(51) Int. Cl.
 *B64C 27/82* (2006.01)
 *B64C 27/59* (2006.01)
(52) U.S. Cl.
 CPC .............. *B64C 27/82* (2013.01); *B64C 27/59* (2013.01); *F16C 2326/43* (2013.01)
(58) Field of Classification Search
 CPC ... B64C 27/12; B64C 27/82; B64C 2027/125; B64C 27/00; B64C 27/006; B64C 27/04; B64C 27/06; B64C 27/35; B64C 27/78; F16C 2326/43; F16C 19/525; F16C 25/06; F16C 35/077; F16H 1/12
 See application file for complete search history.

(56) References Cited

U.S. PATENT DOCUMENTS

| | | | |
|---|---|---|---|
| 5,407,386 A * | 4/1995 | Kish | F16C 27/066 464/99 |
| 5,785,497 A | 7/1998 | White et al. | |
| 6,535,135 B1 | 3/2003 | French et al. | |
| 10,017,247 B1 * | 7/2018 | Elliott | B64C 27/04 |
| 2004/0056772 A1 * | 3/2004 | Sammataro | F16N 29/04 374/E11.006 |
| 2008/0170817 A1 | 7/2008 | McDearmon | |
| 2017/0190415 A1 * | 7/2017 | Sheridan | B64C 27/12 |
| 2019/0276144 A1 * | 9/2019 | Mullen | B64C 27/59 |
| 2019/0368954 A1 * | 12/2019 | Atkins | B64C 27/12 |
| 2020/0156774 A1 * | 5/2020 | Tucker | B64C 27/12 |
| 2021/0261244 A1 * | 8/2021 | Delli Paoli | B64C 27/59 |
| 2023/0192278 A1 * | 6/2023 | Mullen | B64C 27/59 384/448 |

* cited by examiner

*Primary Examiner* — Joshua J Michener
*Assistant Examiner* — Cindi M Curry
(74) *Attorney, Agent, or Firm* — Michael Best & Friedrich LLP

(57) ABSTRACT

A gear box includes a housing, an actuator coupled to the housing, and a bearing assembly pivotably coupled to the actuator. The bearing assembly including an outer raceway, a cylindrical housing positioned within the outer raceway, and an annular bearing positioned between the outer raceway and the housing. The cylindrical housing has a first end and a second end opposite the first end. A sensor is coupled to the first end of the cylindrical housing and configured to monitor an operating condition of the annular bearing. A linkage couples the actuator to the second end of the cylindrical housing and an output shaft is rotatably coupled to the bearing assembly.

20 Claims, 8 Drawing Sheets

BEARING ASSEMBLY

BACKGROUND

Exemplary embodiments relate to the art of rotary wing aircraft, and more particularly, to a sensor for detecting a failure of a bearing in a tail rotor assembly.

In a typical rotary wing aircraft, such as a helicopter for example, a tail rotor system converts tail driveshaft rotary power into the aerodynamic forces necessary to control the direction of flight and to counteract main rotor torque. However, component failures can cause additional torque to be introduced into the helicopter's mechanical system. The added torque can damage system components at unpredictable points in the system.

SUMMARY

In one aspect, the disclosure provides a gear box comprising a housing, an actuator coupled to the housing, and a bearing assembly pivotably coupled to the actuator. The bearing assembly including an outer raceway, a cylindrical housing positioned within the outer raceway, the cylindrical housing having a first end and a second end opposite the first end, an annular bearing positioned between the outer raceway and the housing, a sensor coupled to the first end of the cylindrical housing, the sensor configured to monitor an operating condition of the annular bearing, and a linkage coupling the actuator to the second end of the cylindrical housing. An output shaft rotatably coupled to the bearing assembly.

In another aspect, the disclosure provides a bearing assembly for a gear box of an aircraft. The bearing assembly comprising an outer raceway, a housing positioned within the outer raceway, the housing having first end face and a second end face opposite the first end face, an annular bearing positioned between the outer raceway and the housing, and a sensor coupled to the first end face of the housing, the sensor configured to monitor an operating condition of the annular bearing.

In another aspect, the disclosure provides a gear box comprising a housing, an actuator coupled to the housing, a linkage having a first end pivotably coupled to the actuator and a second end opposite the first end, and a bearing assembly coupled to the second end of the linkage. The bearing assembly including an outer raceway, a cylindrical housing positioned within the outer raceway, an aperture formed in an end of the cylindrical housing, and an annular bearing positioned between the outer raceway and the housing. An output shaft coupled to the bearing assembly. The second end of the linkage is positioned within the aperture and pivotably coupled to the cylindrical housing.

Other aspects and embodiments will become apparent by consideration of the detailed description and accompanying drawings.

DETAILED DESCRIPTION

Before any embodiments are explained in detail, it is to be understood that the disclosure is not intended to be limited in its application to the details of construction and the arrangement of components set forth in the following description or illustrated in the following drawings. Embodiments are capable of other configurations and of being practiced or of being carried out in various ways.

A plurality of hardware and software-based devices, as well as a plurality of different structural components may be used to implement various embodiments. In addition, embodiments may include hardware, software, and electronic components or modules that, for purposes of discussion, may be illustrated and described as if most of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

It also should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
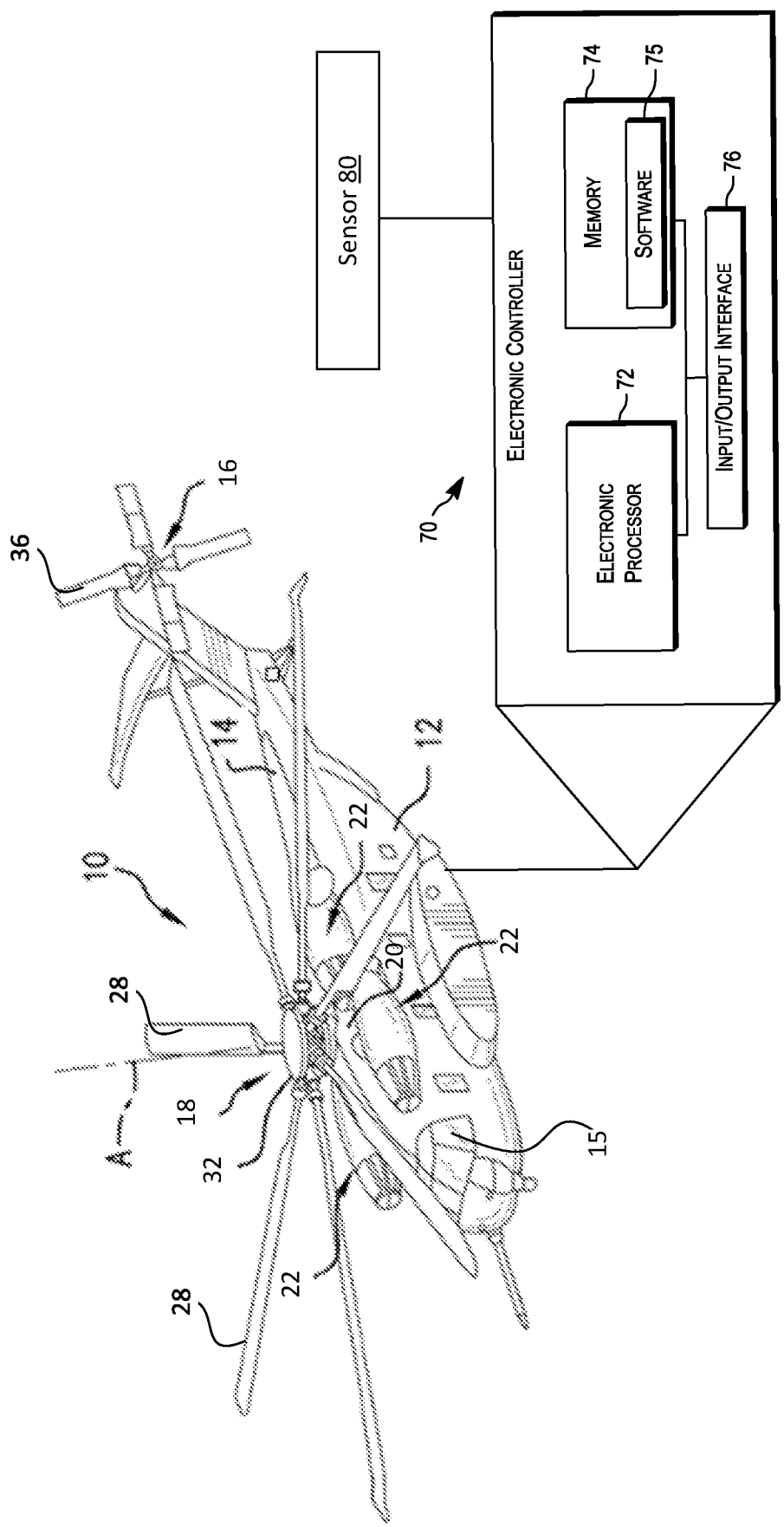
FIG. 1 is a perspective view of a rotary wing aircraft according to an embodiment of the disclosure.

Referring now to the figures, FIG. 1 illustrates a rotary wing aircraft 10 according to some embodiments. The aircraft 10 includes an airframe 12 with an extending tail 14, which mounts a tail rotor assembly 16. The aircraft 10 includes a main rotor assembly 18 that rotates about an axis A through a main rotor gearbox 20 by one or more engines 22. The airframe 12 includes a cockpit 15 having one or more seats for flight crew (e.g., pilot and co-pilot) and optional passengers.

The engines 22 generate the power available for flight operations and couple such power is transmitted to the main rotor assembly 18 and the tail rotor assembly 16 through the main rotor gearbox 20. The main rotor assembly 18 includes a plurality of rotor blades 28 supported by a rotor hub 32. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines or any application with a critical bearing of the configuration described herein will also benefit here from.

The tail rotor assembly 16 includes a plurality of tail rotor blades 36 located at the extending tail 14 and converts the tail driveshaft rotary power into aerodynamic forces necessary to control the direction of flight of the aircraft 10. Similarly, in some embodiments, the propeller blades 36 may be mounted in a static configuration with respect to the aircraft 10 as illustrated in FIG. 1. However, in other embodiments, the tail rotor blades 36 may have a variable position, which allows the tail rotor blades 36 to provide yaw control in addition to translational thrust. Also, in some embodiments, the aircraft 10 may include more than one sets of propeller blades 36, such as, for example, one positioned on the back left of the aircraft 10 and one positioned on the back right of the aircraft 10.

Figure 2:
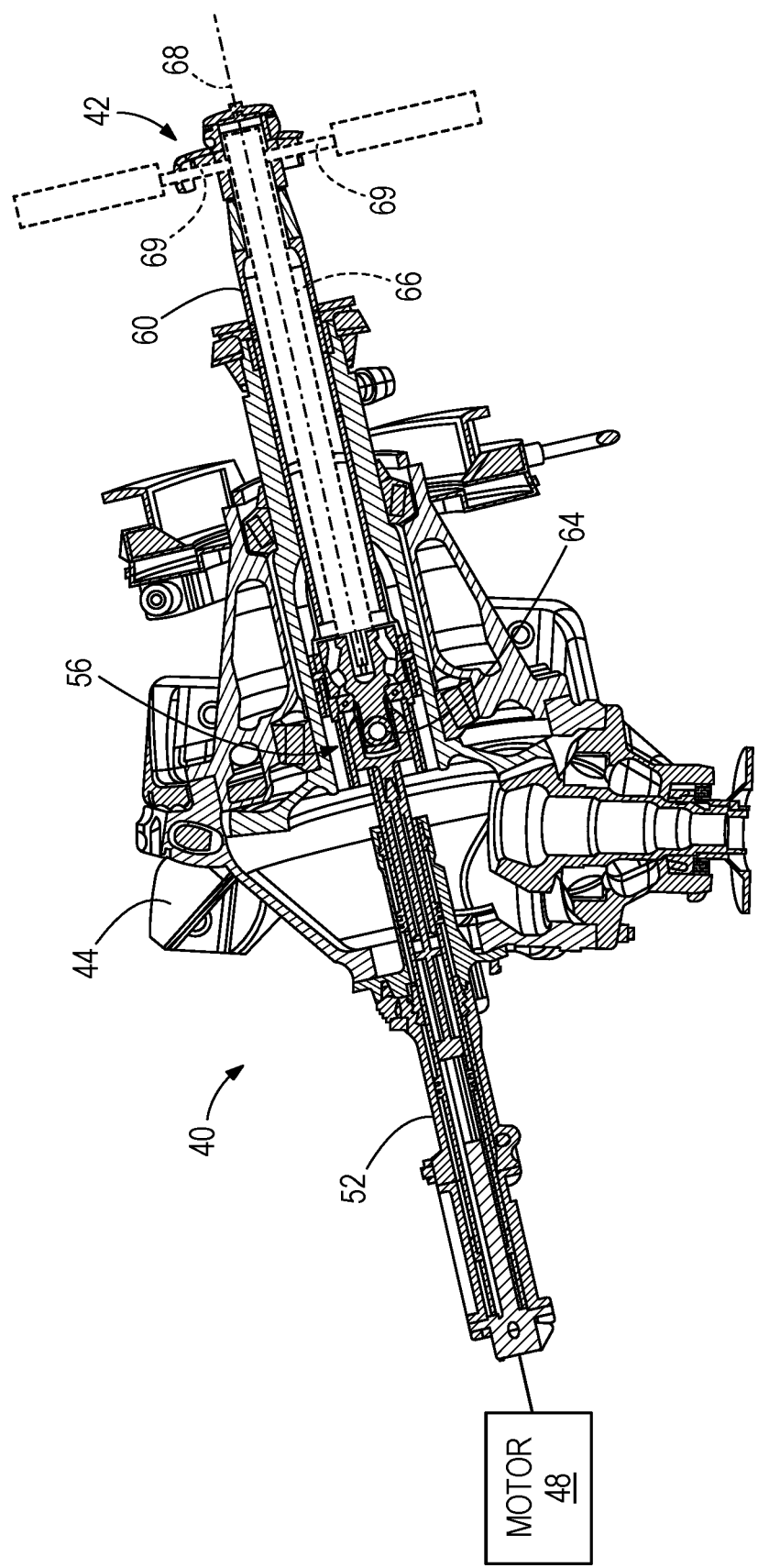
FIG. 2 is a cross-sectional side view of a tail rotor gear box of the aircraft of FIG. 1.
Figure 3:
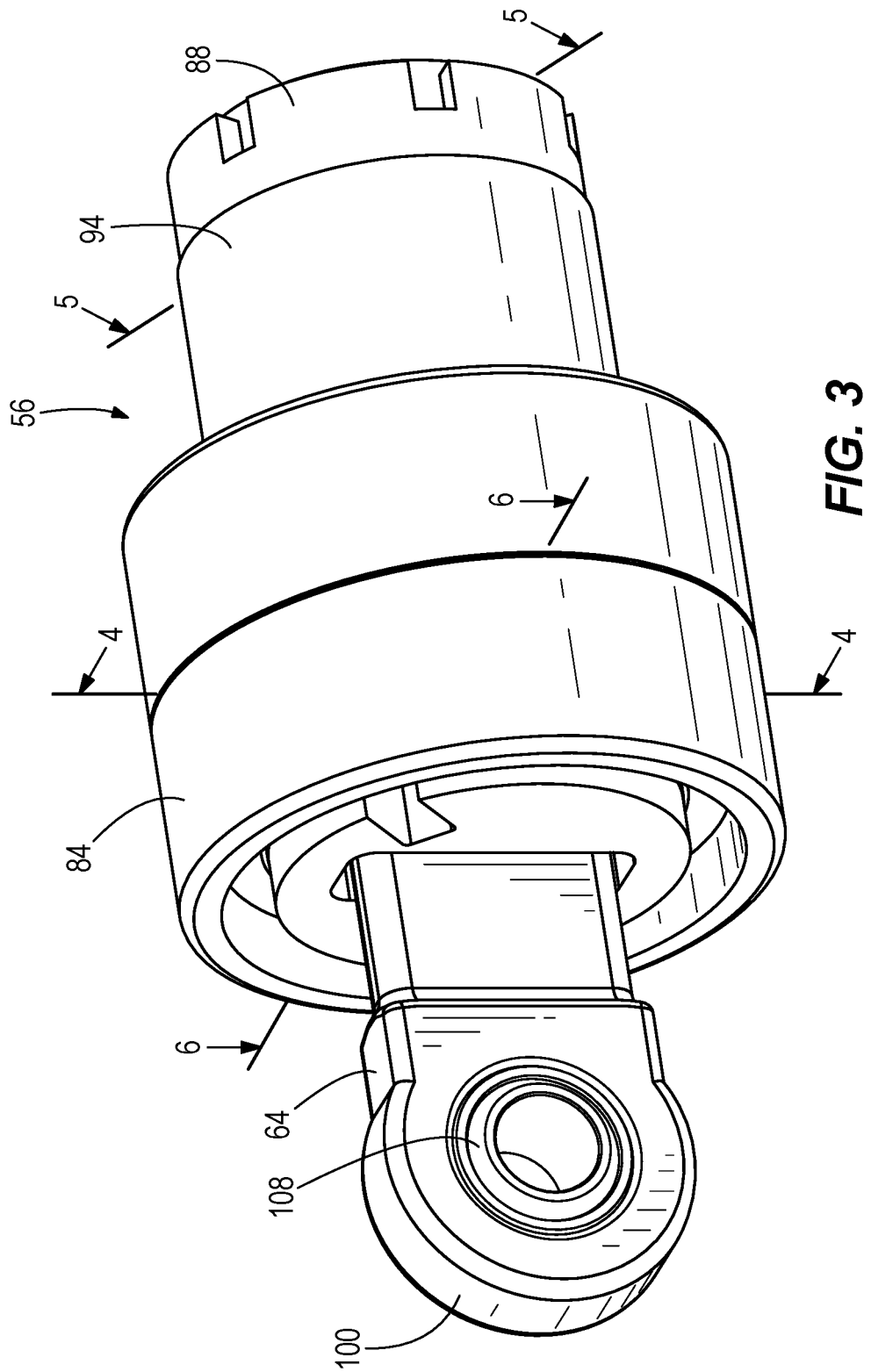
FIG. 3 is a perspective view of a bearing assembly of the tail rotor gear box of FIG. 2.

With reference to FIG. 2, a tail rotor gear box 40 is operably coupled to the tail rotor assembly 16. The tail rotor assembly 16 provides a mounting point for the tail rotor blades 36 (schematically illustrated in FIG. 2) and for a blade pitch change mechanism 42. The gear box 40 includes a housing 44, a first shaft or actuator 52 (e.g., a hydraulic actuated servo) statically mounted to the housing 44, a bearing assembly 56 pivotably coupled to the actuator 52 by a linkage 64 (e.g., at a clevis), and a rotating output shaft 60 coupled to the bearing assembly 56. The actuator 52 is connected to the output shaft 60 of the tail rotor assembly 16 through the bearing assembly 56 that allows the output shaft 60 to rotate about a longitudinal axis 68 while the actuator 52 extends and retracts only and does not spin.

For example, when the actuator 52 moves the adjustment shaft 66 inboard, a pitch walking beam and pitch change control links 69 (schematically illustrated together in FIG. 2) associated with each of the tail rotor blades 36 twist the tail rotor blades 36 about internal elastomeric bearings (not shown) to increase blade pitch. Conversely, when the actuator 52 moves the adjustment shaft 66 outboard, the pitch walking beam and pitch change control links associated with each of the tail rotor blades 36 twist the tail rotor blades 36 about the internal elastomeric bearings to decrease blade pitch. An increase in blade pitch will turn the aircraft 10 to the left and a decrease in pitch will turn the aircraft 10 to the right.

The adjustment shaft 66 also rotates with and moves linearly within the output shaft 60. The bearing assembly 56 supports the adjustment shaft 66 within the output shaft 60 and allows the adjustment shaft 66 and the output shaft 60 to rotate independently of the actuator 52. As will be described below, an outer raceway 84 of the bearing assembly 56 rotates with the adjustment shaft 66 and output shaft 60, while an inner raceway is non-rotating and coupled to the actuator 52 by way of the linkage 64 and thereby moves linearly with the actuator 52.

As also illustrated in FIG. 1, the aircraft 10 includes an electronic controller 70. The electronic controller 70 includes a plurality of electrical and electronic components that provide power, operation control, and protection to the components and modules within the electronic controller 70. The electronic controller 70 can include an electronic processor 72 (such as a programmable electronic microprocessor or similar device) that executes software to control operation of the main rotor assembly 18 and the tail rotor assembly 16. In the example illustrated in FIG. 1, the electronic controller 70 also includes memory 74 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory) and an input-output interface 76.

The electronic processor 72 is communicatively connected to the memory 74 and the input-output interface 76. In some embodiments, the memory 74 stores software 75 executable by the electronic processor 72 to perform the control functionality and associated methods described herein. It should be understood that the electronic controller 70 can include other components, and the configuration illustrated in FIG. 1 is provided as one example. For example, in some embodiments, the electronic controller 70 includes one or more for example, microprocessors, digital signal processors, customized processors and field programmable gate arrays (FPGAs) and unique stored program instructions (including both software and firmware) that control the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

The bearing assembly 56 also includes a sensor 80 (schematically illustrated in FIGS. 1 and 4-6). The sensor 80 generates a signal representing an operating condition (e.g., vibration, temperature, or the like) of the bearing assembly 56 and transmits the signal to the electronic controller 70 (directly or indirectly). Further, since the bearing assembly 56 is isolated from any oil sump of the gear box 40, the sensor 80 may be coupled to the controller 70 through a wired connection. The electronic controller 70 receives such signals via the input-output interface 76 and these signals can be used as part of the control functionality performed by the electronic processor 72 (through execution of the software 75). These received signals (or data derived therefrom) can also be stored in the memory 74. The interface 76 may provide a message to the operator indicating a defect (e.g., failure or near failure) of the bearing assembly 56. For example, the controller 70 may be configured to detect a first threshold of the operating condition corresponding to a first state of the bearing assembly 56 and a second threshold of the operating condition corresponding to a second state of the bearing assembly 56. When the controller 70 detects the first threshold, the processor 72 may initiate a message to alert the operator that maintenance of the bearing assembly 56 is required, but the aircraft 10 can still be operated for a predetermined amount of time (e.g., to allow the operator to get to a service center). When the controller 70 detects the second threshold, the processor 72 may initiate a message to alert the operator that replacement of the bearing assembly 56 is required while also restricting operation of the aircraft 10.

Now with reference to FIGS. 3-6, the bearing assembly 56 includes an outer housing or outer raceway 84, a cylindrical housing 88 positioned within the outer raceway 84, and an annular bearing 92 (e.g., an annular duplex ball bearing) (FIG. 4) positioned between the outer raceway 84 and the cylindrical housing 88. The bearing assembly 56 also includes a sleeve 94 mounted on an outer diameter of the cylindrical housing 88, which is secured to the cylinder housing 88 by a securing member 95 (e.g., a nut, a compression member, etc.). The sleeve 94 engages a shoulder 96 of the cylindrical housing 88 and preloads the annular bearing 92 in between the outer raceway 84 and the cylindrical housing 88. An outer diameter of the cylindrical housing 88 or the sleeve 94 may define the inner raceway of the bearing assembly 56. The output shaft 60 and the adjustment shaft 66 surrounds the cylindrical housing 88 and are coupled to the outer raceway 84 of the bearing assembly 56. In the illustrated embodiment, the shoulder 96 is positioned proximate a first end (e.g., left end from the reference point of FIG. 6) of the outer raceway 84.

In other embodiments, the shoulder 96 may be formed in the cylindrical housing 88 proximate a second end (e.g., right end from the reference point of FIG. 6) of the outer raceway 84. Moving the shoulder 96 proximate the second end allows more room for seals and ball races to be properly located. In addition, the shoulder 96 may have a larger contact area when the shoulder 96 is located proximate the second end, which increases a load capacity of the bearing assembly 56. In addition, extension forces from the actuator 52 (e.g., from a right-side of the bearing assembly 56 with reference to FIG. 4) on the bearing assembly 56 reacts against the shoulder 96 and retraction forces (from a left-side of the bearing assembly 56 with reference to FIG. 4) from the actuator 52 causes the sleeve 94 to react against the securing member 95.

Figure 4:
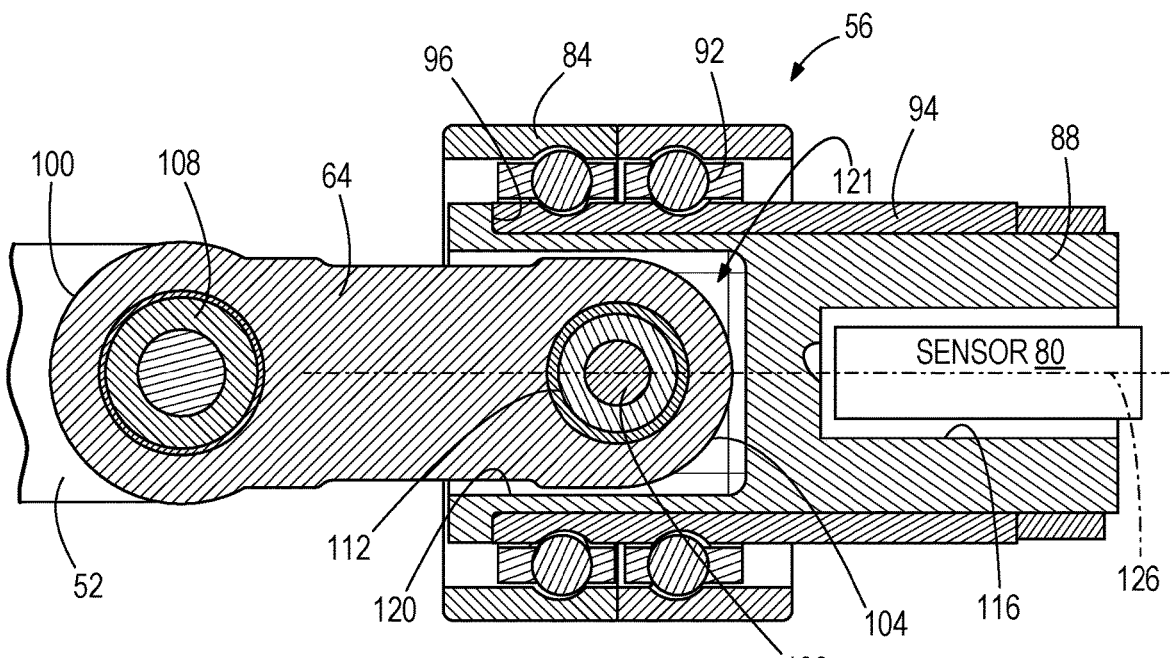
FIG. 4 is a cross-sectional side view of the bearing assembly of FIG. 3 about line 4-4.
Figure 6:
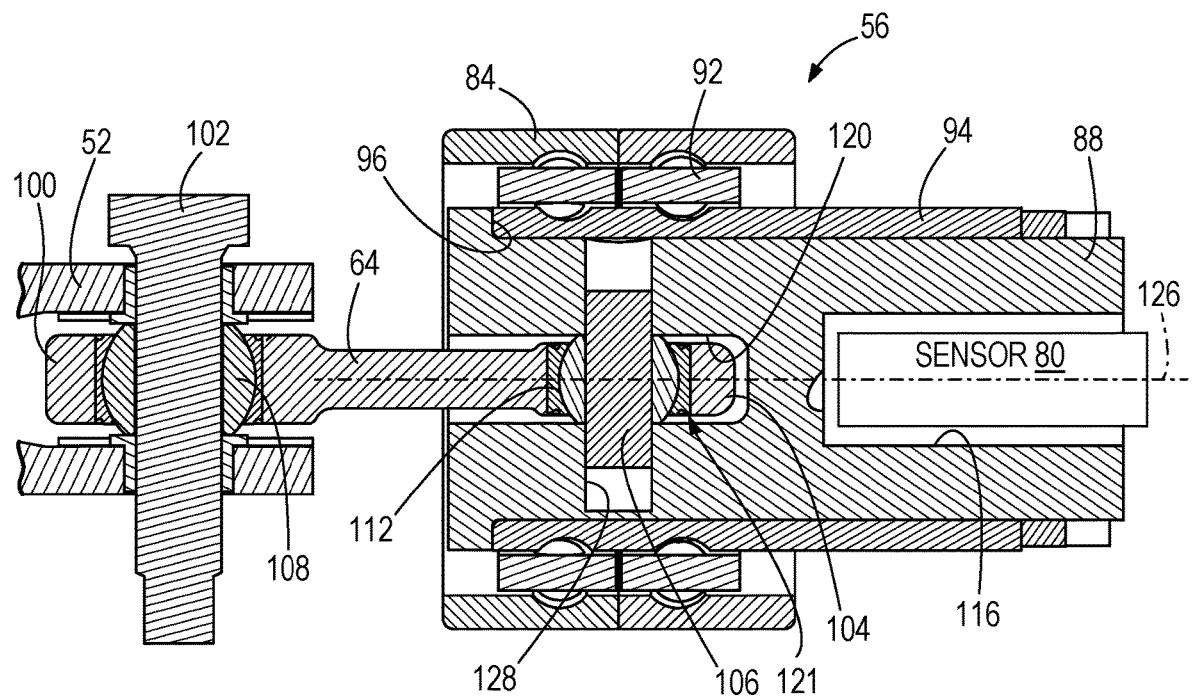
FIG. 6 is a cross-sectional top view of the bearing assembly of FIG. 3 about line 6-6.

As shown in FIGS. 4 and 6, the linkage 64 further includes a first end 100 pivotably coupled to the actuator 52 via a fastener 102 and a second end 104 pivotably coupled to the cylindrical housing 88 of the bearing assembly 56 via a second fastener 106. In the illustrated embodiment, a first bearing 108 (e.g., a first spherical pivot bearing) is positioned adjacent the first end 100 of the linkage 64 and a second bearing 112 (e.g., a second spherical pivot bearing) is spaced from the first bearing 108 and positioned adjacent the second end 104. The first and second bearings 108, 112 enable the bearing assembly 56 to adapt or self-align when there is an offset between the actuator 52 and the output shaft 60 in response to movement of the actuator 52. The self-alignment of the bearing assembly 56 reduces significant moment loading of the annular bearing 92.

Figure 5:
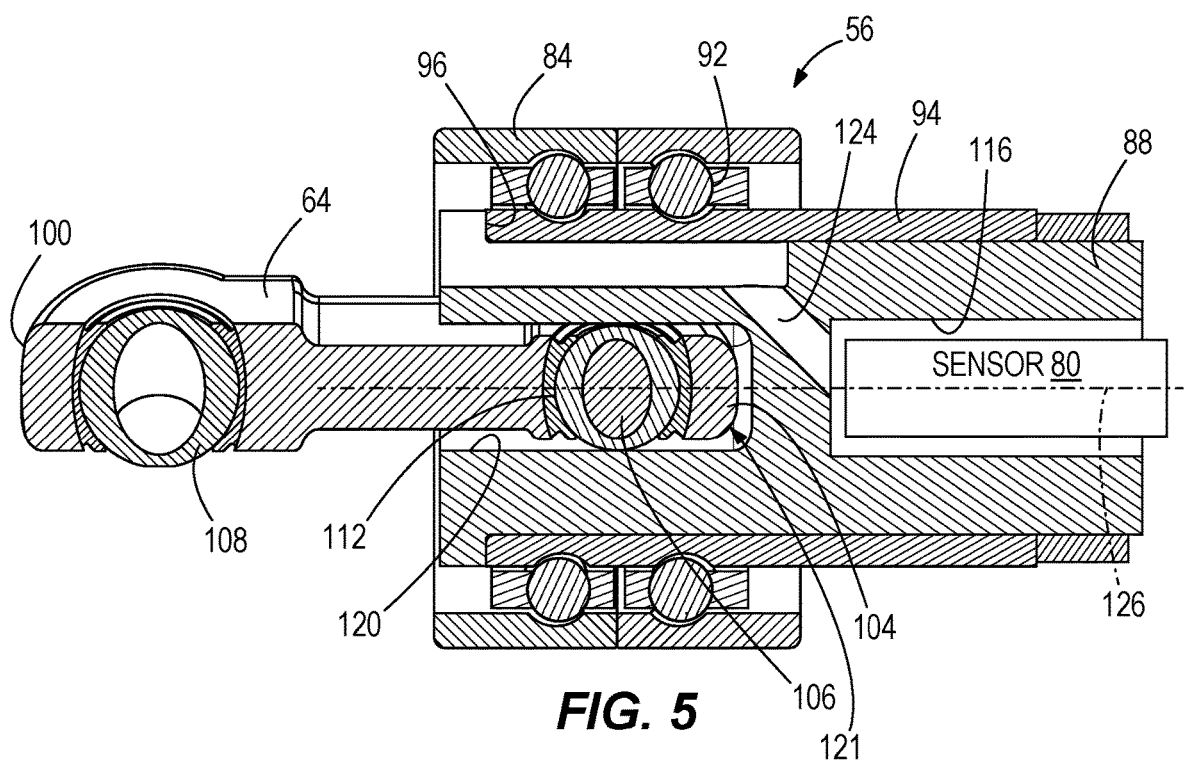
FIG. 5 is a cross-sectional top view of the bearing assembly of FIG. 3 about line 5-5.

With reference to FIGS. 4-6, a first aperture 116 is formed in a first end of the cylindrical housing 88 and a second aperture 120 is formed in a second end of the cylindrical housing 88. The first aperture 116 extends partially along the length of the cylindrical housing 88 and is sized to receive the sensor 80. The sensor 80 may be press fit into the aperture 116, threaded or the like. It should be appreciated that the sensor 80 is coupled to the first end of the cylindrical housing 88. The construction of the aperture 116 allows the sensor 80 to be positioned proximate the annular bearing 92 to detect an operating condition (e.g., vibration, temperature, or the like) of the annular bearing 92. In addition, the second spherical pivot bearing 112 is positioned approximately centrally within the outer raceway 84, which allows the sensor 80 to positioned proximate the outer raceway 84 without the linkage passing through or beyond the outer raceway 84. The position of the second spherical pivot bearing 112 ensures the second spherical pivot bearing 112 and the sensor 80 are within a load zone of the bearing assembly 56. In particular, positioning the sensor 80 proximate the load zone to detect overheating or vibration of the annular bearing 92.

Figure 7:
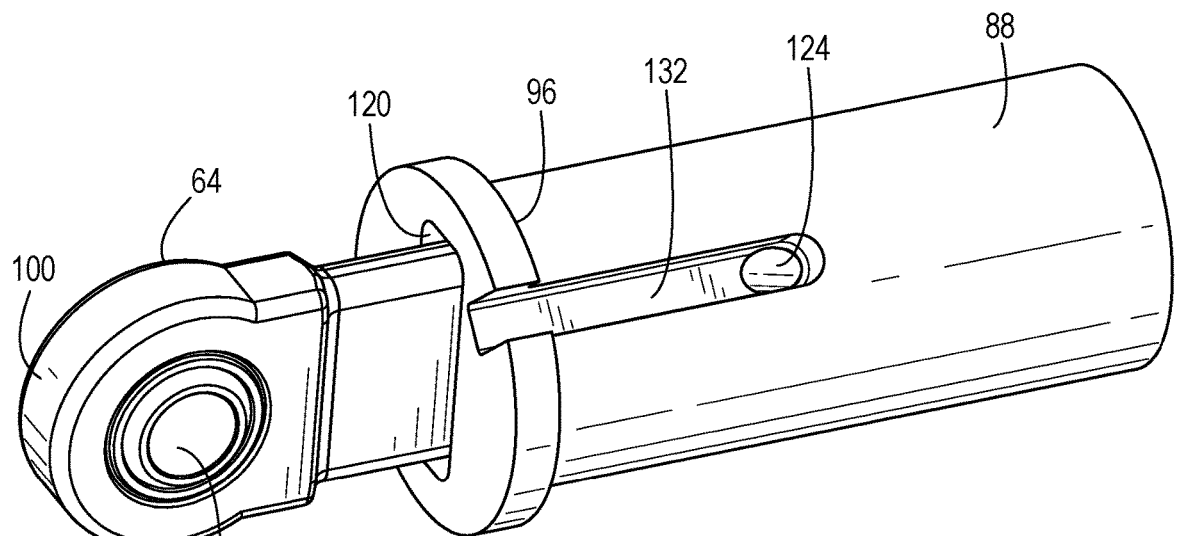
FIG. 7 is a perspective view of the bearing assembly of FIG. 3 with a portion of the bearing assembly removed to illustrate a wire passage of the bearing assembly.
Figure 8:
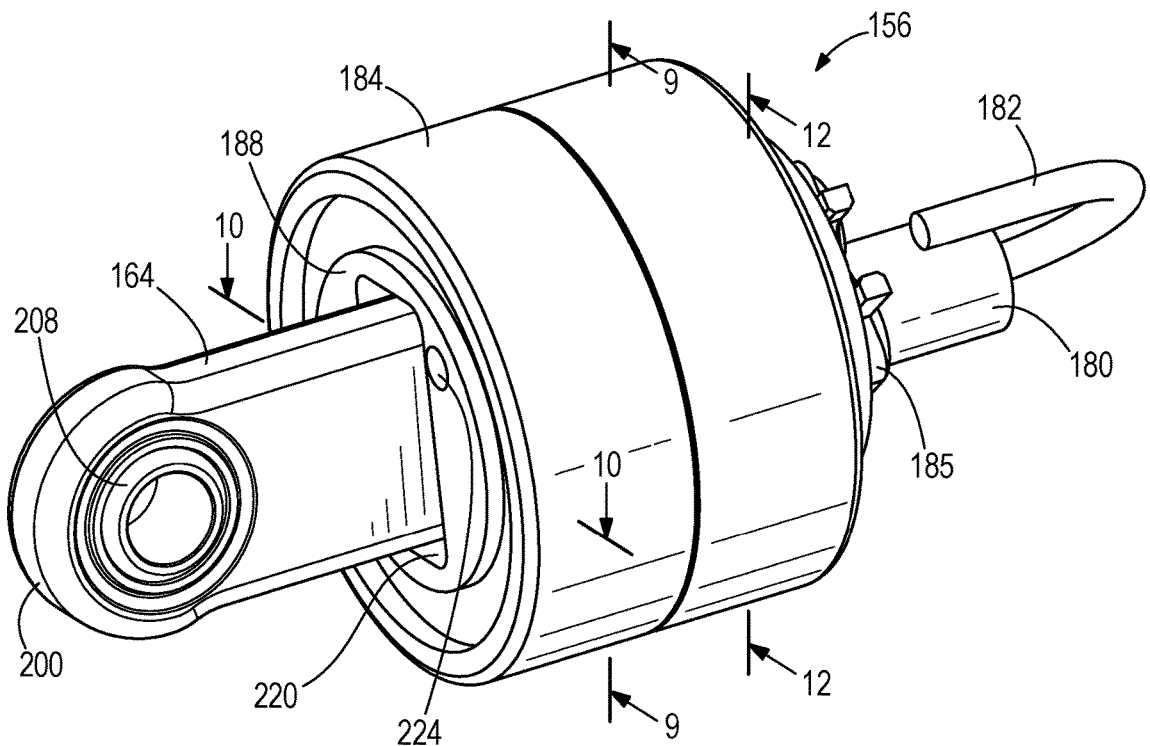
FIG. 8 is a perspective view of a bearing assembly of the tail rotor gear box of FIG. 2 according to another embodiment.

Now with reference to FIGS. 5 and 7, the cylindrical housing 88 further includes a wire passage 124 in communication with the first aperture 116. In other words, the wire passage 124 is formed in the first end of the cylindrical housing 88 and extends through the cylindrical housing 88 to the second end. The wire passage 124 provides space for a wired connection between the sensor 80 and the controller 70 (FIG. 1). In the illustrated embodiment, the aperture 116 is parallel to a longitudinal axis 126 of the cylindrical housing 88 and the wire passage 124 extends at an angle relative to the aperture 116 and the longitudinal axis 126. The wire passage 124 also extends to a recess 132 that is formed an outer surface of the cylinder housing 88 (FIG. 7). The recess 132 extends through the shoulder 96 of the cylindrical housing 88 to allow the wired connection to exit the bearing assembly 56.

The second aperture 120 extends partially along the length of the cylindrical housing 88 and defines an integral clevis 121 (FIGS. 4 and 5) that is configured to receive the second bearing 112 and the second end 104 of the linkage 64. The second aperture 120 allows the second bearing 112 and the pivot point of the linkage 64 to be positioned proximate a center point of the annular bearing 92. The cylindrical housing 88 further includes a through hole 128 (FIG. 6) perpendicular to first aperture 116, the second aperture 120, and the longitudinal axis 126 of the cylindrical housing 88. The through hole 128 is sized to receive the fastener 106 that secures the second bearing 112 and the second end 104 of the linkage 64 to the cylindrical housing 88. In the illustrated embodiment, the fastener 106 is recessed within the cylindrical housing 88 (e.g., positioned below an outer diameter surface of the cylindrical housing 88). Further, the sleeve 94 surrounds the through hole 128 to restrict access to the through hole 128 when the bearing assembly 56 is assembled.

FIGS. 8-13 illustrate a second embodiment of a bearing assembly 156, with like components and features as the embodiment of the bearing assembly 56 shown in FIGS. 1-7 being labeled with like reference numerals plus "100". The bearing assembly 56 is utilized for a tail rotor gear box in an aircraft similar to the tail rotor gear box 40 for the aircraft 10 of FIGS. 1 and 2 and, accordingly, the discussion of the aircraft 10 and tail rotor gear box 40 above similarly applies to the bearing assembly 156 and is not re-stated. Rather, only differences between the bearing assembly 56 of FIGS. 3-7 and the bearing assembly 156 of FIGS. 8-13 are specifically noted herein.

The bearing assembly 156 includes an outer housing or outer raceway 184, a cylindrical housing 188 positioned within the outer raceway 184, and an annular bearing 192 (e.g., an annular duplex ball bearing) (FIG. 9) positioned between the outer raceway 184 and the cylindrical housing 188. The bearing assembly 156 also includes a shoulder 196 that preloads the annular bearing 192 in between the outer raceway 184 and the cylindrical housing 188. An outer diameter of the cylindrical housing 188 defines the inner raceway of the bearing assembly 156.

Figure 9:
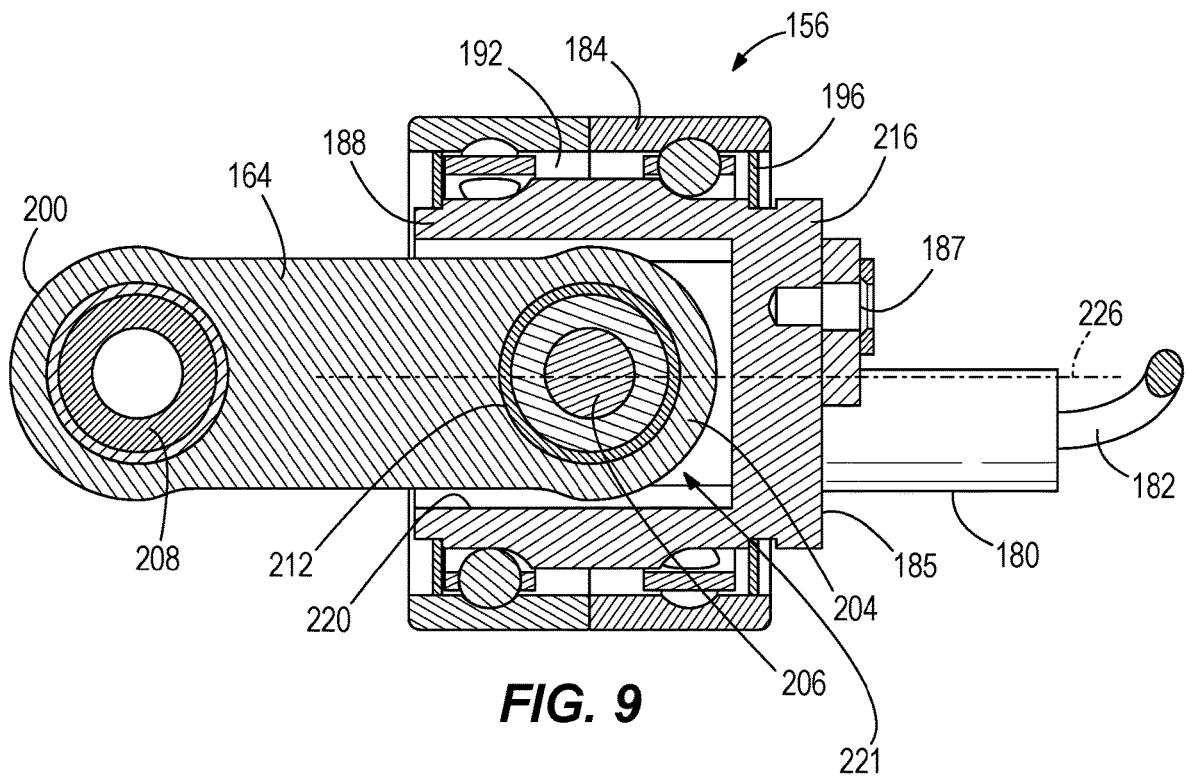
FIG. 9 is a cross-sectional side view of the bearing assembly of FIG. 8 about line 9-9.
Figure 10:
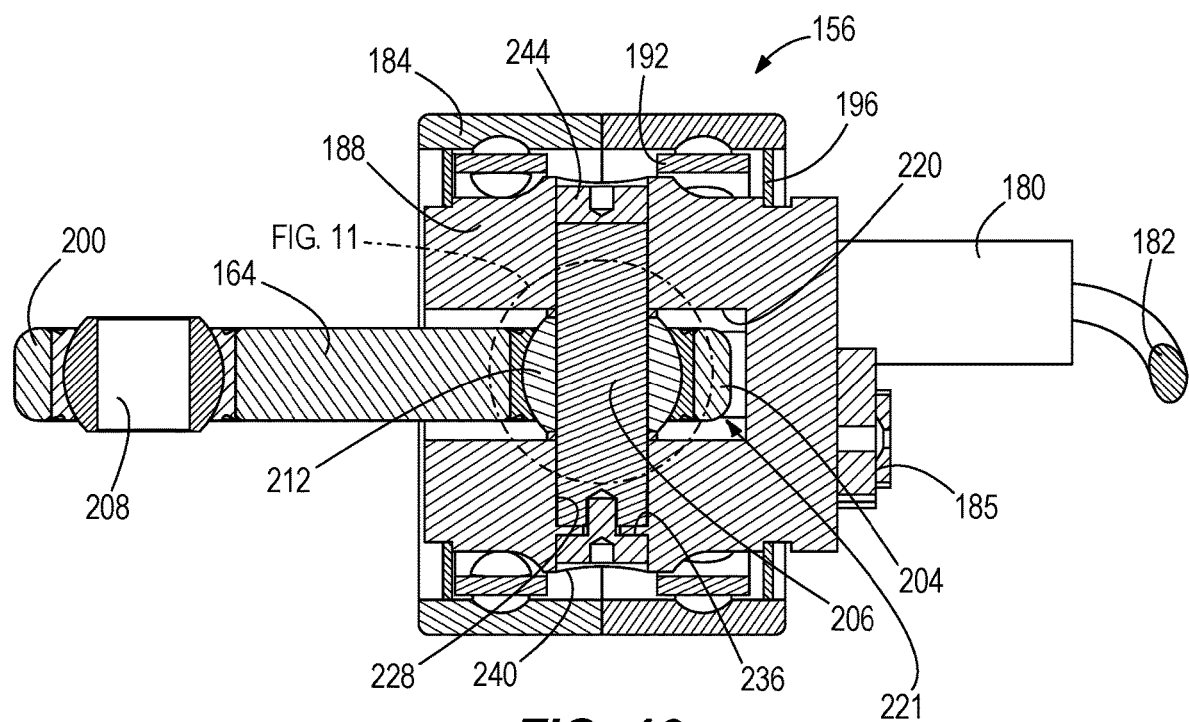
FIG. 10 is a cross-sectional top view of the bearing assembly of FIG. 8 about line 10-10.

As shown in FIGS. 9 and 10, the linkage 164 further includes a first end 200 pivotably coupled to the actuator 52 (FIG. 2) (e.g., via a fastener) and a second end 204 pivotably coupled to the cylindrical housing 188 of the bearing assembly 156 via a fastener 206. In the illustrated embodiment, a first bearing 208 (e.g., a first spherical pivot bearing) is positioned adjacent the first end 200 of the linkage 164 and a second bearing 212 (e.g., a second spherical pivot bearing) is spaced from the first bearing 208 and positioned adjacent the second end 204. The first and second bearings 208, 212 enable the bearing assembly 156 to adapt or self-align when there is an offset between the actuator 152 and the output shaft 60 in response to movement of the actuator 52. The self-alignment of the bearing assembly 156 reduces significant moment loading of the annular bearing 192.

Figure 12:
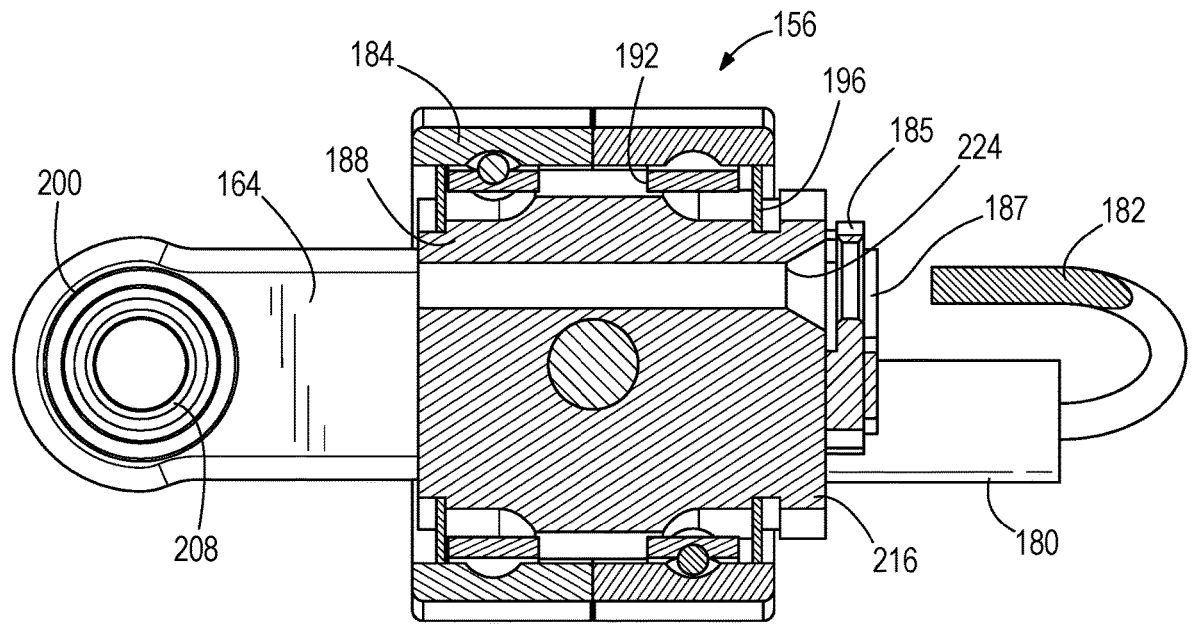
FIG. 12 is a cross-sectional top view of the bearing assembly of FIG. 8 about line 12-12.
Figure 13:
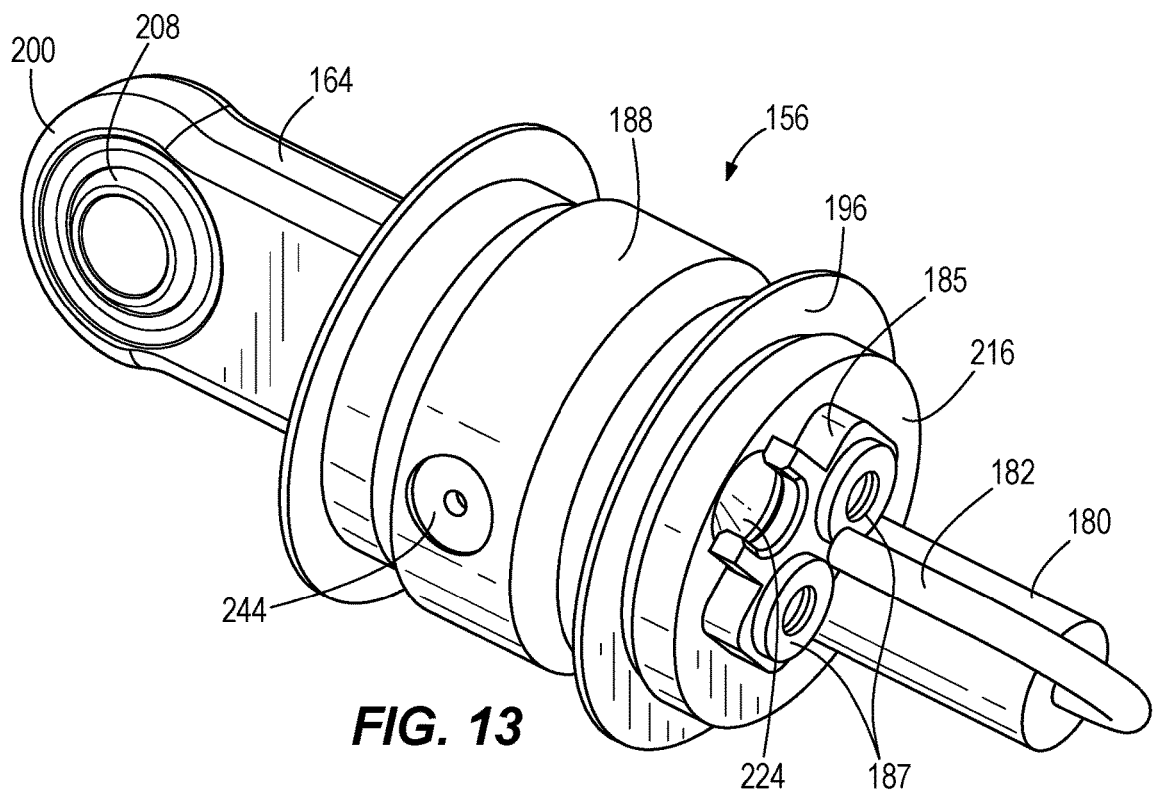
FIG. 13 is a perspective view of the bearing assembly of FIG. 3 with a portion of the bearing assembly removed.

With reference to FIGS. 12 and 13, a sensor 180 is coupled to a first end face 216 of the cylindrical housing 188 and an aperture 220 is formed in a second end of the cylindrical housing 188. In some embodiments, the sensor 180 may be directly coupled to (e.g., threaded into) the cylindrical housing 188. In other embodiments, the sensor 180 may be coupled to the cylindrical housing 188 via a bracket or the like. Coupling the sensor 180 to the first end face 216 allows the sensor 180 to be positioned proximate a loading zone of the annular bearing 192 to detect an operating condition (e.g., vibration, temperature, or the like) of the annular bearing 192. In addition, the cylindrical housing 188 further includes a wire passage 224 formed in the first end face 216 and extending through the cylindrical housing 188 to the second end of the cylindrical housing 188. The wire passage 224 provides space for a wire 182 to connect between the sensor 180 and the controller 70 (FIG. 1). In the illustrated embodiment, the wire passage 224 extends parallel to a longitudinal axis 226. Further, the wire 182 extends from the sensor 180 and makes a 180 degree bend and enters through the wire passage 224 in the cylindrical housing 188. Further, the bearing assembly 156 includes a bracket 185 coupled to the cylindrical housing 188 via one or more fasteners 187 (FIG. 13) and configured to secure the wire 182 in the wire passage 224. For example, the wire 182 may have a crimped-on seal that will seat inside the bracket 185 and the wire passage 224.

Figure 11:
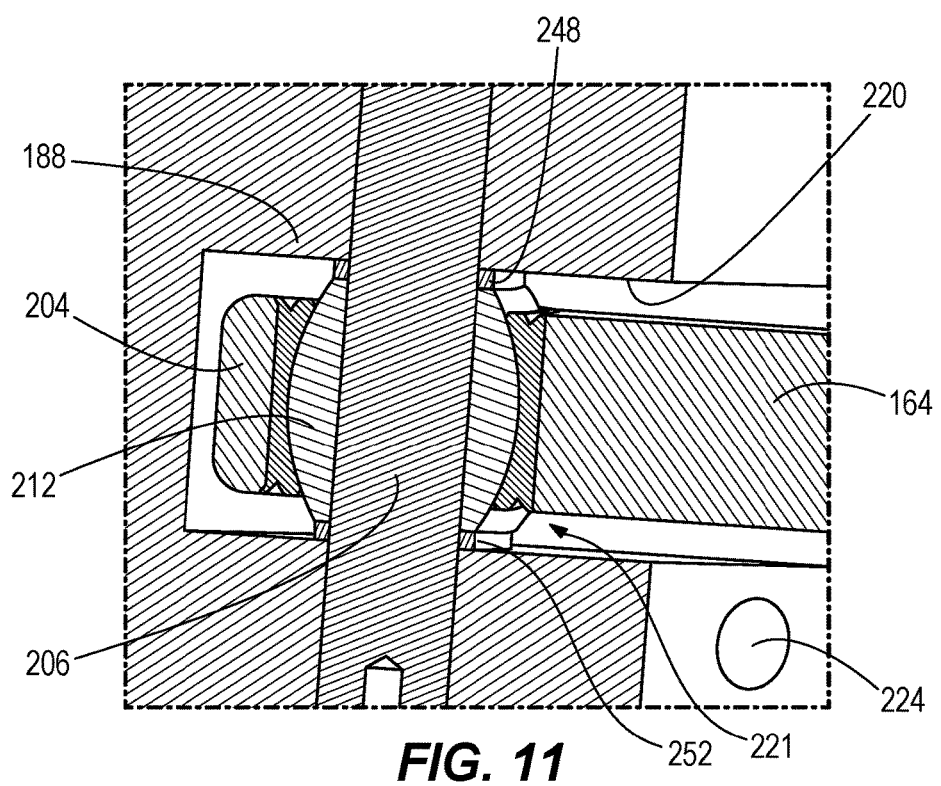
FIG. 11 is an isolated perspective of a portion of the bearing assembly of FIG. 8 about the section 11 in FIG. 10.

With reference to FIGS. 10 and 11, the aperture 220 extends partially along the length of the cylindrical housing 188 and defines an integral clevis 221 that is configured to receive the second bearing 212 and the second end 204 of the linkage 164. The aperture 220 allows the second bearing 212 and the pivot point of the linkage 164 to be positioned proximate a center point of the annular bearing 192. The cylindrical housing 188 further includes a through hole 228 (FIG. 10) perpendicular to the aperture 220, and the longitudinal axis 226 of the cylindrical housing 188. The through hole 228 is sized to receive the fastener 206 that secures the second bearing 212 and the second end 204 of the linkage 164 to the cylindrical housing 188. In the illustrated embodiment, the fastener 206 is recessed within the cylindrical housing 188 (e.g., positioned below an outer diameter surface of the cylindrical housing 188). Further, the annular bearing 192 and outer raceway 184 surrounds the through hole 228 to restrict access to the through hole 228 when the bearing assembly 156 is assembled.

In contrast to the bearing assembly 56, the arrangement of the sensor 180 of the bearing assembly 156 allows a larger size annular bearing 192 to be used, and allows the through hole 228 to receive a larger diameter fastener 206. The larger diameter fastener allows for the bearing assembly 156 to handle significantly greater loads. In the illustrated embodiment, the fastener 206 is clearance fit in the through hole 228 of the cylindrical housing 188 and seated against a shoulder 236. The fastener 206 is further secured within the through hole 228 with a first retaining member 240 and a second retaining member 244. The first retaining member 240 extends through the shoulder 236 and engages the fastener 206. The second retaining member 244 may be a plug (FIG. 13) that is press-fit into the through hole 228. The bearing assembly 156 further includes a pair of washers 248, 252 positioned between the second bearing 212 and the aperture 220. The pair of washers 248, 252 create an additional standoff between the linkage 164 and the aperture 220, which allows the linkage 164 to swivel over a larger angle while retaining a tight tolerancing of the second bearing 212 and the aperture 220.

Various features and advantages are set forth in the following claims.

What is claimed is:

1. A gear box comprising:
a housing;
an actuator coupled to the housing;
a bearing assembly pivotably coupled to the actuator, the bearing assembly including:
an outer raceway,
a cylindrical housing positioned within the outer raceway, the cylindrical housing having a first end and a second end opposite the first end,
an annular bearing positioned between the outer raceway and the cylindrical housing,
a sensor coupled to the first end of the cylindrical housing, the sensor configured to monitor an operating condition of the annular bearing, and
a linkage pivotably coupling the actuator to the second end of the cylindrical housing, and
an output shaft rotatably coupled to the bearing assembly.

2. The gear box of claim 1, wherein
the gear box is a tail rotor gear box that is operably coupled to a tail rotor assembly having tail rotor blades, and
the actuator is operably coupled to an adjustment shaft to adjust a blade pitch of the tail rotor blades.

3. The gear box of claim 1, wherein a wire passage is formed in the first end of the cylindrical housing and extends through the cylindrical housing to the second end, and wherein the wire passage provides space for a wired connection between the sensor and a controller.

4. The gear box of claim 3, wherein the wire passage is parallel to a longitudinal axis of the cylindrical housing.

5. The gear box of claim 1, wherein the linkage has a first end pivotably coupled to the actuator and a second end pivotably coupled to the cylindrical housing of the bearing assembly.

6. The gear box of claim 5, wherein
an aperture is formed in the second end of the cylindrical housing, and
the aperture defines an integral clevis that is sized to receive the second end of the linkage.

7. The gear box of claim 6, further comprising a first bearing positioned adjacent the first end of the linkage and a second bearing positioned adjacent the second end.

8. The gear box of claim 7, further comprising a washer positioned between the second bearing and the aperture.

9. The gear box of claim 8, wherein
the cylindrical housing includes a through hole perpendicular to a longitudinal axis the cylindrical housing, and the through hole is sized to receive a fastener that secures the second end of the linkage to the cylindrical housing.

10. The gear box of claim 9, wherein the fastener is recessed within the cylindrical housing.

11. The gear box of claim 1, wherein the operating condition of the annular bearing is one or more of a temperature or a vibration of the annular bearing.

12. A bearing assembly for a gear box of an aircraft, the bearing assembly comprising
an outer raceway;
a cylindrical housing positioned within the outer raceway, the housing having a first end face and a second end opposite the first end face;
an annular bearing positioned between the outer raceway and the housing; and
a sensor coupled to the first end face of the cylindrical housing, the sensor configured to monitor an operating condition of the annular bearing.

13. The bearing assembly of claim 12, wherein a wire passage is formed in the first end face of the cylindrical housing and extends through the cylindrical housing to the second end, and wherein the wire passage provides space for a wire that forms a wired connection between the sensor and a controller.

14. The bearing assembly of claim 13, wherein the wire passage is parallel to a longitudinal axis of the housing.

15. The gear box of claim 13, further comprising a bracket coupled to the first end face, and wherein the bracket is configured to secure the wire within the wire passage.

16. The bearing assembly of claim 12, wherein
an aperture is formed in the second end of the housing, and
the aperture defines an integral clevis that is sized to receive an end of a linkage.

17. A gear box comprising:
a housing;
an actuator coupled to the housing;
a linkage having a first end pivotably coupled to the actuator and a second end opposite the first end;
a bearing assembly coupled to the second end of the linkage, the bearing assembly including:
an outer raceway,
a cylindrical housing positioned within the outer raceway,
an aperture formed in an end of the cylindrical housing, and
an annular bearing positioned between the outer raceway and the housing, and
an output shaft coupled to the bearing assembly,
wherein the second end of the linkage is positioned within the aperture and pivotably coupled to the cylindrical housing.

18. The gear box of claim 17, wherein
the cylindrical housing includes a first end and a second end opposite the first end,
a sensor coupled to the first end of the housing,
the aperture formed in the second end of the housing, and
the sensor is configured to monitor an operating condition of the annular bearing.

19. The gear box of claim 17, further comprising a washer positioned between the second bearing and the aperture.

20. The gear box of claim 17, wherein
the cylindrical housing includes a through hole perpendicular to a longitudinal axis of the cylindrical housing,
the through hole is sized to receive a fastener that secures the second end of the linkage to the cylindrical housing.

* * * * *